United States Patent
Matsuura (10) Patent No.: US 7,532,944 B2
(45) Date of Patent: May 12, 2009

(54) AUDIO REPRODUCING APPARATUS AND MUSIC SELECTION METHOD

(75) Inventor: Masaki Matsuura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 643 days.

(21) Appl. No.: 11/149,069

(22) Filed: Jun. 9, 2005

(65) Prior Publication Data

US 2006/0004471 A1    Jan. 5, 2006

(30) Foreign Application Priority Data

Jun. 14, 2004    (JP) .............................. 2004-175447

(51) Int. Cl.
*G06F 17/00*    (2006.01)

(52) U.S. Cl. .............. 700/94; 700/3; 700/7; 700/104.1; 725/47; 725/53

(58) Field of Classification Search ........................ None
See application file for complete search history.

(56) References Cited

U.S. PATENT DOCUMENTS

| | | | | |
|---|---|---|---|---|
| 5,371,553 A * | 12/1994 | Kawamura et al. | ............. | 725/59 |
| 5,918,303 A * | 6/1999 | Yamaura et al. | ............... | 84/609 |
| 6,164,543 A * | 12/2000 | Kato et al. | ............. | 235/462.25 |
| 6,337,694 B1 * | 1/2002 | Becker et al. | ................ | 345/684 |
| 6,553,179 B1 * | 4/2003 | Miwa et al. | .................... | 386/94 |
| 6,700,839 B1 * | 3/2004 | Auflick et al. | ........... | 369/30.08 |
| 6,744,711 B1 * | 6/2004 | Ceshkovsky | ............. | 369/44.28 |
| 6,763,377 B1 * | 7/2004 | Belknap et al. | .............. | 709/223 |
| 6,846,979 B2 * | 1/2005 | Kondo | .......................... | 84/609 |
| 6,850,258 B2 * | 2/2005 | Saitoh et al. | ................. | 715/830 |
| 6,865,718 B2 * | 3/2005 | Levi Montalcini | .......... | 715/786 |
| 7,154,479 B2 * | 12/2006 | Balle et al. | .................... | 345/169 |
| 7,312,785 B2 * | 12/2007 | Tsuk et al. | .................... | 345/156 |
| 2001/0011991 A1 * | 8/2001 | Wang et al. | .................. | 345/156 |
| 2002/0030665 A1 * | 3/2002 | Ano | ........................... | 345/168 |
| 2002/0054168 A1 * | 5/2002 | Ohmura | ....................... | 345/854 |
| 2003/0095096 A1 * | 5/2003 | Robbin et al. | ................ | 345/156 |
| 2004/0055446 A1 * | 3/2004 | Robbin et al. | .................. | 84/615 |
| 2005/0097442 A1 * | 5/2005 | Green | ..................... | 715/501.1 |
| 2005/0223329 A1 * | 10/2005 | Schwartz et al. | ............. | 715/711 |
| 2005/0257130 A1 * | 11/2005 | Ito | ............................ | 715/500.1 |
| 2006/0080622 A1 * | 4/2006 | Stuart | .......................... | 715/853 |

* cited by examiner

*Primary Examiner*—Curtis Kuntz
*Assistant Examiner*—Paul McCord
(74) *Attorney, Agent, or Firm*—Brinks Hofer Gilson & Lione (57) ABSTRACT

There is provided an audio reproducing apparatus and a music selection method which can quickly search for desired music data from a large number of music data recorded on a recording medium such as a hard disk. When a rotary encoder is rotated at a low speed, a display mode is set to a low speed search mode, and a title of music data at a position being searched is displayed on a display unit. When the rotary encoder is rotated at a high speed, the display mode is changed to a high speed search mode, information common to music data at a position being searched and successive music data, such as a folder name of a folder storing these music data, an album name, an artist name, and/or a recorded date, is displayed on the display unit.

17 Claims, 8 Drawing Sheets

| TITLE | ARTIST | ALBUM | YEAR | GENRE |
|---|---|---|---|---|
| time will tell | Hikaru Utada | SINGLE COLLECTION VOL.1 | 2004 | JPOP |
| Automatic | Hikaru Utada | SINGLE COLLECTION VOL.1 | 2004 | JPOP |
| Movin' on without you | Hikaru Utada | SINGLE COLLECTION VOL.1 | 2004 | JPOP |
| First Love | Hikaru Utada | SINGLE COLLECTION VOL.1 | 2004 | JPOP |
| Addicted To You[UP-IN-HEAVEN MIX] | Hikaru Utada | SINGLE COLLECTION VOL.1 | 2004 | JPOP |
| Wait & See -Risk- | Hikaru Utada | SINGLE COLLECTION VOL.1 | 2004 | JPOP |
| For You | Hikaru Utada | SINGLE COLLECTION VOL.1 | 2004 | JPOP |
| Time Limit | Hikaru Utada | SINGLE COLLECTION VOL.1 | 2004 | JPOP |
| Can You Keep A Secret? | Hikaru Utada | Deep River | 2004 | JPOP |
| FINAL DISTANCE | Hikaru Utada | Deep River | 2004 | JPOP |
| traveling | Hikaru Utada | Deep River | 2004 | JPOP |
| Hikari | Hikaru Utada | Deep River | 2004 | JPOP |
| SAKURA Drops | Hikaru Utada | Deep River | 2004 | JPOP |
| Letters | Hikaru Utada | Deep River | 2004 | JPOP |
| COLORS | Hikaru Utada | Deep River | 2004 | JPOP |

FIG.11

Title Automatic

Artist Hikaru Utada

Album SINGLE COLLECTION

FIG.12

# AUDIO REPRODUCING APPARATUS AND MUSIC SELECTION METHOD

BACKGROUND OF THE INVENTION

1. Field of the Invention

The present invention relates to an audio reproducing apparatus which reproduces music data recorded on recording media such as a hard disk and a CD-R (CD-recordable) and a music selection method for the audio reproducing apparatus.

2. Description of the Prior Art

Recently, there have widely been used on-vehicle audio reproducing apparatuses which reproduce music data recorded on recording media such as hard disks and CD-Rs. Generally, it is possible to record music data including one hundred or more songs on a single disk if a CD-R is used as the recording medium, or several thousands of songs if a hard disk is used as the recording medium.

In general, music data recorded on a CD-R or a hard disk are compressed by means of audio signal compression methods such as MP3 (MPEG Audio Layer-3) and WMA (Windows Media Audio). Moreover, the music data usually include added information such as a title, an album name, a genre, and an artist name. The audio reproducing apparatus can use the added information to display the title, the genre, the album name, and the artist name of the recorded songs on a display unit (display).

Because the size of the on-vehicle audio reproducing apparatus is prescribed by the DIN (German industrial standard), it is thus difficult to install a large display panel thereon, and the amount of information to be displayed on the display panel is limited. Japanese Laid-Open Patent Publication (Kokai) No. 2002-304873 describes an audio reproducing apparatus (sound reproducing device) which scrolls an album name or title to be displayed on a display panel if the number of characters contained in the album name or title is larger than the number of characters which can be fit in the display panel.

Figure 1:
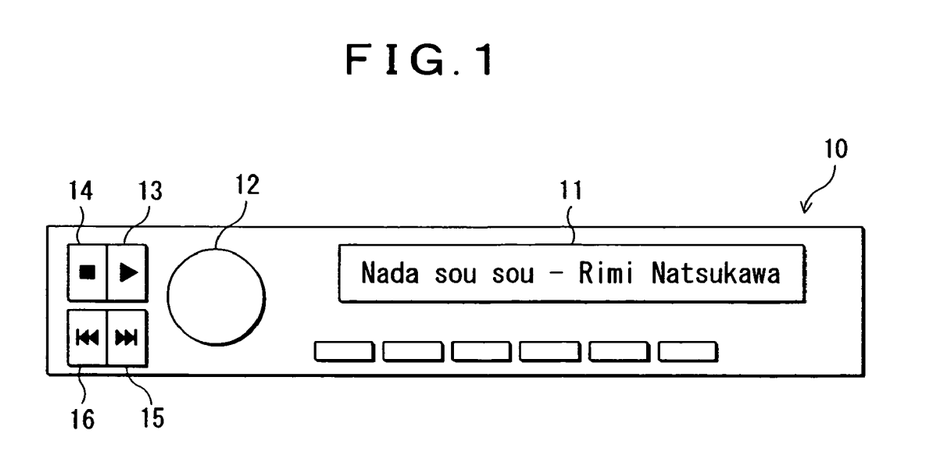
FIG. 1 is a front view showing an example of a conventional on-vehicle audio reproducing apparatus.

FIG. 1 is a front view showing an example of a conventional on-vehicle audio reproducing apparatus. As shown in FIG. 1, the on-vehicle audio reproducing apparatus 10 is provided with a display unit 11 for displaying a title and an artist name, a rotary encoder 12, and operation buttons such as a play button 13, a stop button 14, a track-up button 15, and a track-down button 16. For example, if music data recorded on a hard disk is reproduced, on the display unit 11 is shown the title of first music data recorded on the hard disk upon the power being turned on. Thereafter, the title present on the display unit 11 is changed each time the rotary encoder 12 is turned clockwise or counterclockwise by a certain angle. Upon a desired title being shown on the display unit 11, if the rotation of the rotary encoder 12 is stopped and the play button 13 is depressed, reproduction of the music data starts.

However, the conventional audio apparatus shown in FIG. 1 displays the next title each time the rotary encoder 12 is rotated by the certain angle, and it is thus necessary to quickly rotate the rotary encoder 12 to search for a desired song in a short period if a large number of the music data are stored on the recording medium.

Figure 2:
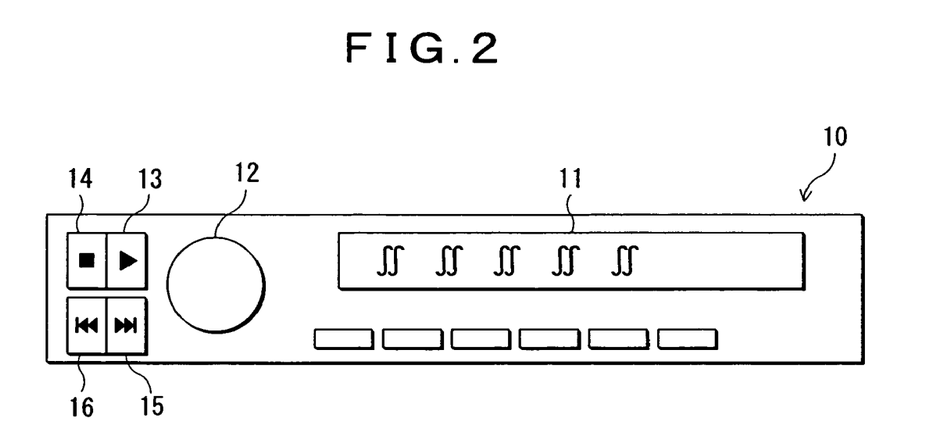
FIG. 2 is a view showing a problem of the conventional audio reproducing apparatus, which presents a display state of a display unit upon a rotary encoder being rotated at a high speed.

However, if the rotational speed of the rotary encoder 12 is increased, the time available to show the title of a single song becomes excessively short, the title shown on the display unit 11 becomes unrecognizable as shown in FIG. 2, and the progress of the search becomes incomprehensible. Thus, it is conventionally necessary to occasionally stop the rotation of the rotary encoder 12 to check to which song the search has progressed, resulting in additional time taken to find the desired music data.

SUMMARY OF THE INVENTION

It is an object of the present invention to provide an audio reproducing apparatus and a music selection method therefor which enable a search for desired music data in a short period from a large number of music data recorded on a recording medium.

An audio reproducing apparatus according to the present invention is comprised of a recording medium that records multiple music data, a data reading unit that reads out the music data from the recording medium, a signal processing unit that performs signal processing of the music data read out by the data reading unit and then converts the music data into an audio signal, an operation unit that is provided with operation elements, a display unit, and a main control unit that controls the data reading unit, the signal processing unit, and the display unit according to a signal received from the operation unit, where the main control unit sets a display mode to either a low speed search mode or a high speed search mode based upon a signal supplied from the operation unit according to an operation carried out on the operation element. Upon the low speed search mode being set, the main control unit sequentially searches for the music data recorded on the recording medium and displays a title of music data at a position being searched on the display unit, and upon the high speed search mode being set, the main control unit sequentially searches for the music data recorded on the recording medium and displays information common to music data at a position being searched and music data successive to the music data at the position being searched on the display unit.

A music selection method according to the present invention for an audio reproducing apparatus including a recording medium that records multiple music data, a data reading unit that reads out the music data from the recording medium, a signal processing unit that performs signal processing of the music data read out by the data reading unit and then converts the music data into an audio signal, an operation unit that is provided with operation elements, a display unit, and a main control unit that controls the data reading unit, the signal processing unit, and the display unit according to a signal received from the operation unit, where the main control unit sets a display mode to either a low speed search mode or a high speed search mode based upon a signal supplied from the operation unit according to an operation carried out on the operation element, upon the low speed search mode being set, the main control unit sequentially searches for the music data recorded on the recording medium and displays a title of music data at a position being searched on the display unit, and upon the high speed search-mode being set, the main control unit sequentially searches for the music data recorded on the recording medium and displays information common to music data at a position being searched and music data successive to the music data at the position being searched on the display unit.

According to the present invention, the display mode is set to either the low speed search mode or the high speed search mode based upon the signal supplied from the operation unit according to the operation carried out on the operation element. For example, in case of a rotary encoder being used as the operation element, if the rotary encoder rotates at a low speed, the low speed search mode is set, and if the rotary encoder rotates at a high speed, the high speed search mode is set. Upon the low speed search mode being set, the main control unit sequentially searches for the music data recorded on the recording medium and displays a title of music data at a position being searched on the display unit, and upon the high speed search mode being set, the main control unit sequentially searches for the music data recorded on the recording medium and displays information common to music data at a position being searched and music data successive thereto such as a folder name of a folder which records these music data, an album name, and/or an artist name on the display unit. The above information is displayed on the display unit for a period longer than the case of the title being displayed, thereby enabling easy recognition thereof, resulting in the user comprehending the progress of the search.

DETAILED DESCRIPTION OF THE PREFERRED EMBODIMENTS

A description will now be given of embodiments of the present invention with reference to accompanying drawings.

First Embodiment

Figure 3:
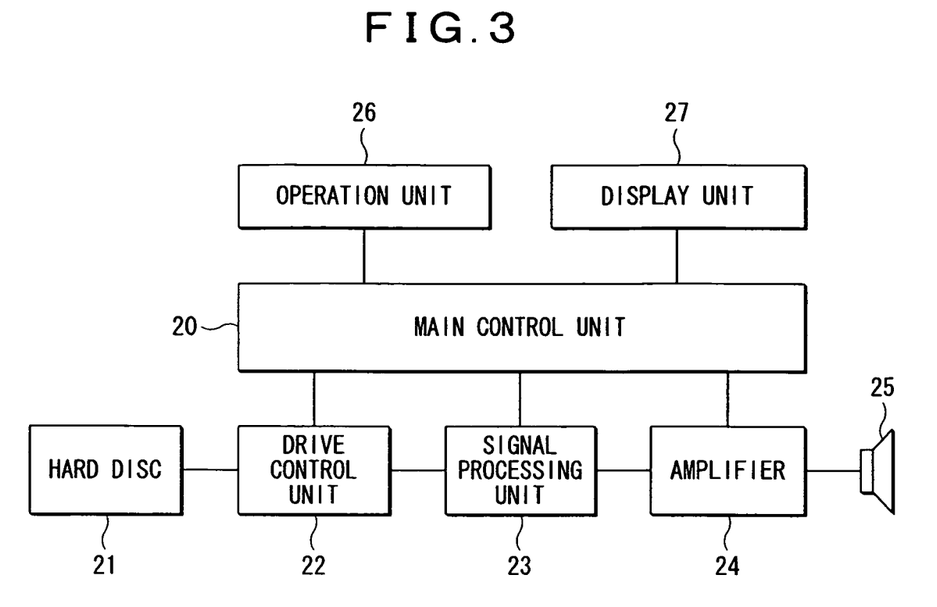
FIG. 3 is a block diagram showing the configuration of an audio reproducing apparatus according to a first embodiment of the present invention.
Figure 4:
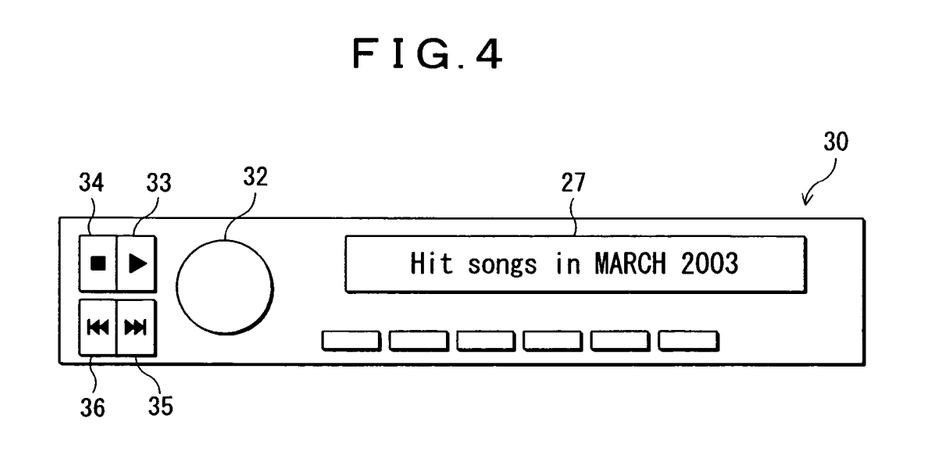
FIG. 4 is a front view showing the audio reproducing apparatus in FIG. 3.

FIG. 3 is a block diagram showing the configuration of an audio reproducing apparatus according to a first embodiment of the present invention, and FIG. 4 is a front view showing the audio reproducing apparatus in FIG. 3.

The audio reproducing apparatus 30 according to the present embodiment includes a main control unit 20, a hard disk 21, a drive control unit (data reading unit) 22, a signal processing unit 23, an amplifier 24, a speaker 25, an operation unit 26, and a display unit 27.

On the hard disk 21 are recorded a large number of music data compressed by means of the MP3 method, for example. It is assumed that added information such as a title, an album name, an artist name, and a genre is added to the respective music data in the present embodiment. Moreover, on the hard disk 21 are recorded data indicating the time and date of the recording on the hard disk 21 for the respective music data.

The drive control unit 22 controls the drive of the hard disk 21 according to a signal from the main control unit 20 to read out the music data and the added information. The signal processing unit 23 performs signal processing on the music data read out from the hard disk 21 to convert the music data into an analog audio signal, or to provide the added information to the main control unit 20. The amplifier 24 amplifies the analog audio signal received from the signal processing unit 23 to drive the speaker 25.

On the operation unit 26 are provided a rotary encoder 32, a play button 33, a stop button 34, a track-up button 35, a track-down button 36, and other operation buttons as shown in FIG. 4. The operation unit 26 supplies a pulse signal (referred to as a click signal hereinafter) and a signal indicating the rotational direction to the main control unit 20 every time the rotary encoder 32 is rotated clockwise or counterclockwise by a certain rotational angle. Moreover, the display unit 27 is a liquid crystal panel, for example, and is attached to a front panel of the audio reproducing apparatus 30 as shown in FIG. 4.

Figure 5:
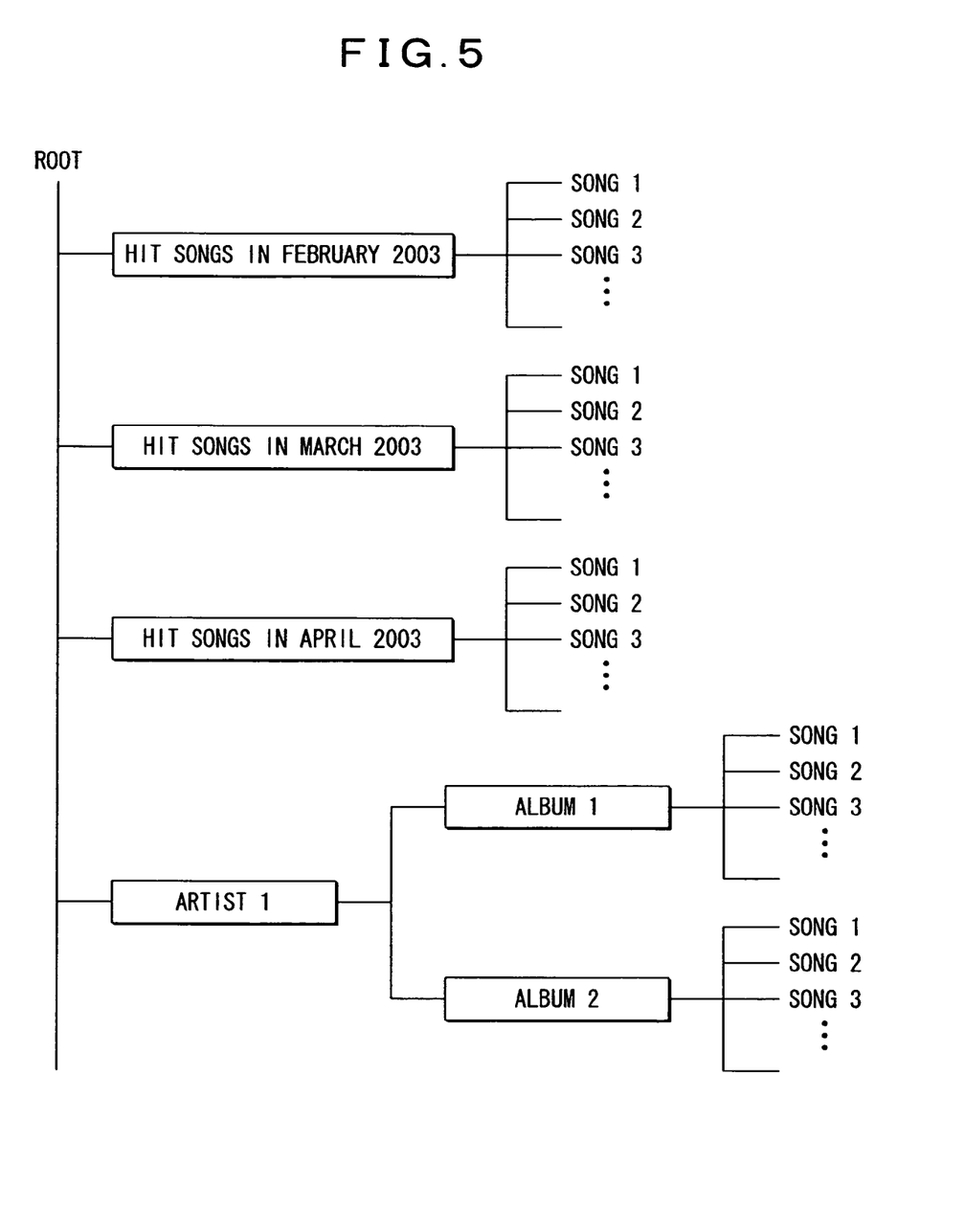
FIG. 5 is a pattern diagram showing a state of music data recorded on a hard disk.

FIG. 5 is a pattern diagram showing a state of the music data recorded on the hard disk 21. It is assumed that, according to the present embodiment, as shown in FIG. 5, the music data (songs) are classified into folders. Although a name of a folder can be arbitrarily set, there are shown "Hit songs in February 2003", "Hit songs in March 2003", "Hit songs in April 2003", "Artist 1", "Album 1", and "Album 2" as examples of the folder names in FIG. 5. It is possible to create one or more folders under a folder, as "Album 1" and "Album 2" folders are created under the "Artist 1" folder. Usually, a single folder stores several to several dozens of music data (song 1, song 2, song 3, . . . ).

Figure 6:
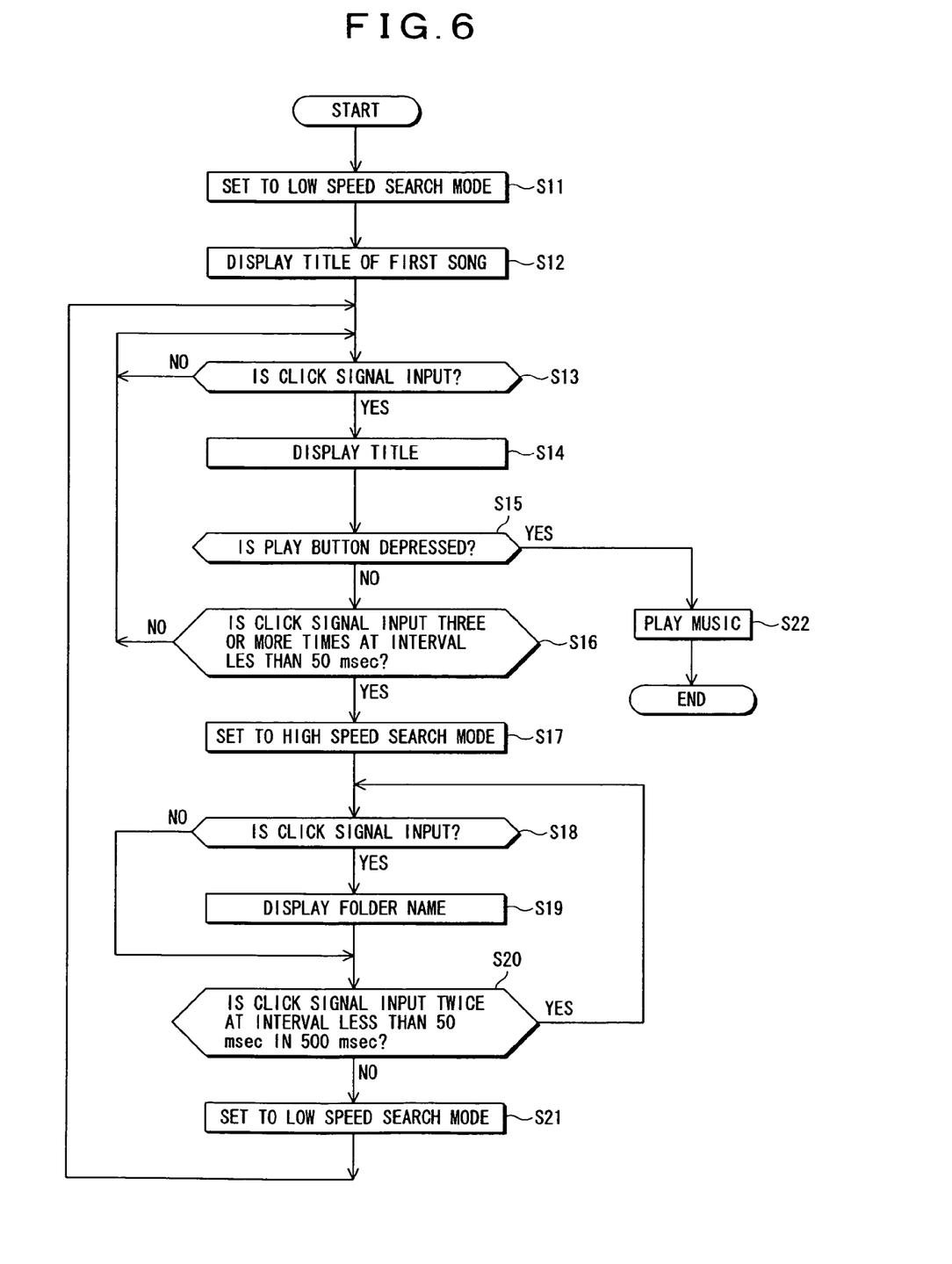
FIG. 6 is a flowchart showing a music selection method according to the first embodiment.

FIG. 6 is a flowchart showing a music selection method on the audio reproducing apparatus configured as described above.

For example, when the audio reproducing apparatus is turned on, the main control unit 20 sets a display mode to a low speed search mode (title display mode) as shown in step S11. The main control unit 20 proceeds to step S12 to read out the added information of a first music data from the hard disk 21 through the drive control unit 22, and displays the title of the first music data on the display unit 27.

The main control unit 20 then proceeds to step S13, and monitors whether the rotary encoder 32 is rotated or not, namely whether the click signal is received from the operation unit 26 or not. If the rotary encoder 32 is rotated, and the click signal is consequently provided to the main control unit 20, the main control unit 20 proceeds to step S14, and reads out the added information of the next music data to display the title on the display unit 27.

Although the main control unit 20 displays the title of the next music data on the display unit 27 upon the rotary encoder 32 being rotated clockwise as described above, the main control unit 20 reads out the added information of the previous music data and displays the title of the read music data on the display unit 27 upon the rotary encoder 32.being rotated counterclockwise.

The main control unit 20 proceeds to step S15, and determines whether the play button 33 is depressed or not. If the play button 33 is depressed, the main control unit 20 proceeds to step S22, reads out the music data whose title is displayed on the display unit 27 from the hard disk 21 through the drive control unit 22, and provides the read music data to the signal processing unit 23. Thereafter, the music data is converted to an analog audio signal by the signal processing unit 23 and is supplied to the speaker 25 through the amplifier 24. As a result, music is provided for a user.

On the other hand, if the main control unit 20 determines that the play button 33 is not depressed in step S15, the main control unit 20 proceeds to step S16. In step S16, the main control unit 20 determines whether the rotary encoder 32 rotates at a high speed or not. In the present embodiment, the main control unit 20 determines that the rotary encoder 32 rotates at a high speed when the click signal is successively entered three or more times in an interval less than 50 msec. In this case, the main control unit 20 proceeds from step S16 to step S17. On the other hand, if the click signal is not successively entered three or more times in the interval less than 50 msec, the main control unit 20 returns to step S13.

If the main control unit 20 proceeds to step S17, namely determines that the rotary encoder 32 is rotating at a high speed, the main control unit 20 changes the display mode to the high speed search mode (folder name display mode). The main control unit 20 then proceeds to step S18, and determines whether the rotary encoder 32 is rotated or not, namely whether the click signal is entered from the operation unit 26 or not. If the main control unit 20 determines that the click signal is entered, the main control unit 20 proceeds to step S19. On the other hand, if the main control unit 20 determines that the click signal is not entered, the main control unit 20 proceeds to step S20.

In step S19, the main control unit 20 reads out the added information of the next music data from the hard disk 21 through the drive control unit 22, and displays the folder name on the display unit 27. On this occasion, the same folder name appears on the display unit 27 as shown in FIG. 4 while the music data is searched for within the folder, and the position being searched can thus be recognized even if the rotary encoder 32 is rotated at a high speed.

The main control unit 20 then proceeds to step S20, and determines whether the rotary encoder 32 comes to rotate at a low speed or not. The main control unit 20 determines that the rotary encoder 32 continues to rotate at a high speed upon two click signals being entered at an interval shorter than 50 msec within 500 msec, and returns to step S18. The main control unit 20 then reads out the added information of the next music data each time the click signal is entered, and displays the folder name on the display unit 27 in step S19.

On the other hand, the main control unit 20 determines that the rotary encoder 32 comes to rotate at a low speed upon two click signals not being entered at an interval shorter than 50 msec within 500 msec, and proceeds to step S21.

The main control unit 20 changes the display mode to the low speed search mode (title display mode) in step S21, then returns to step S13, and continues the processing.

In the present embodiment, as described above, since the main control unit 20 displays the title on the display unit 27 upon the rotary encoder 32 being rotated at a low speed, and displays the folder name on the display unit 27 upon the rotary encoder 32 being rotated at a high speed, the user can readily recognize the progress of the search for the song while rotating the rotary encoder 32. As a result, the present embodiment enables the user to search for desired music data from a large number of music data in a short period, thereby providing considerably increased usability compared with the conventional case.

Figure 7:
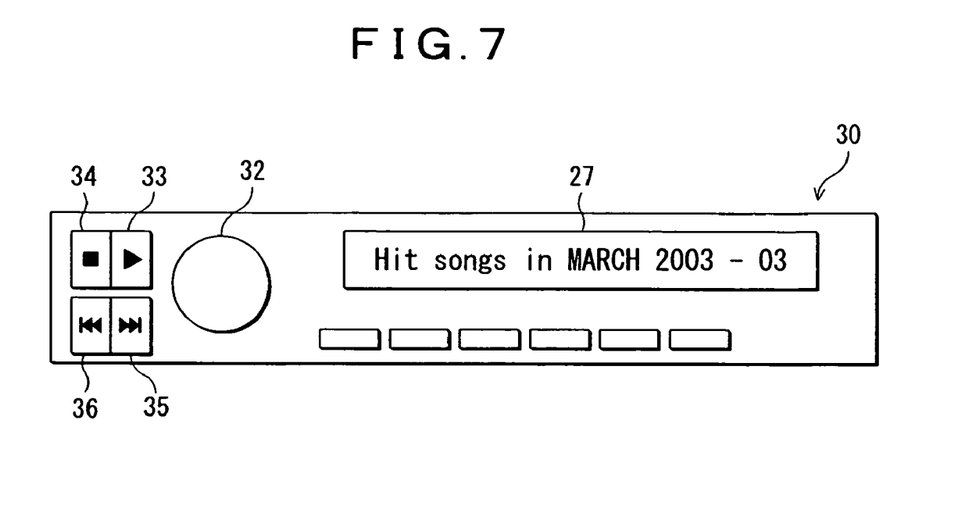
FIG. 7 is a view showing a variation of the first embodiment.

Although the folder name is displayed when the rotary encoder 32 is rotated at a high speed according to the first embodiment described above, the position of the music data within the folder may be displayed in addition to the folder name as shown in FIG. 7.

Second Embodiment

Figure 8:
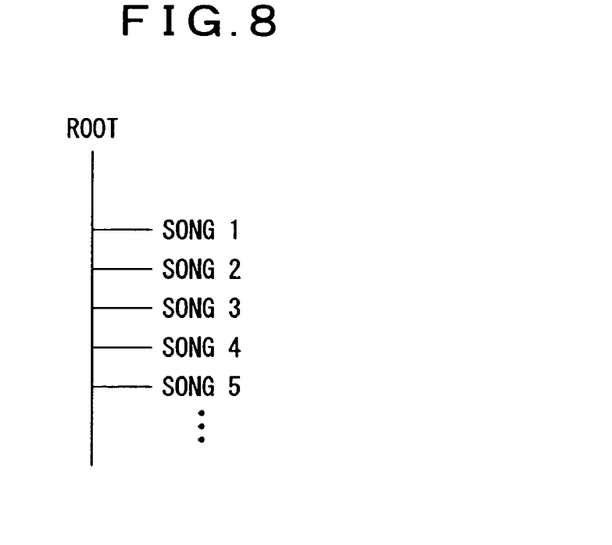
FIG. 8 is a pattern diagram showing a state of music data recorded on the hard disk.

In the above first embodiment, there appears the folder name of a folder recording music data at a position being searched when the rotary encoder 32 is rotated at a high speed. However, as a pattern diagram (pattern diagram presenting the state of music data recorded on the hard disk 21) of FIG. 8 shows, the embodiment cannot be applied unless the music data (song 1, song 2, song 3, . . . ) are classified into folders. A description will now be given of a music selection method according to a second embodiment which can be applied to the case where music data are not classified into folders.

Figure 9:
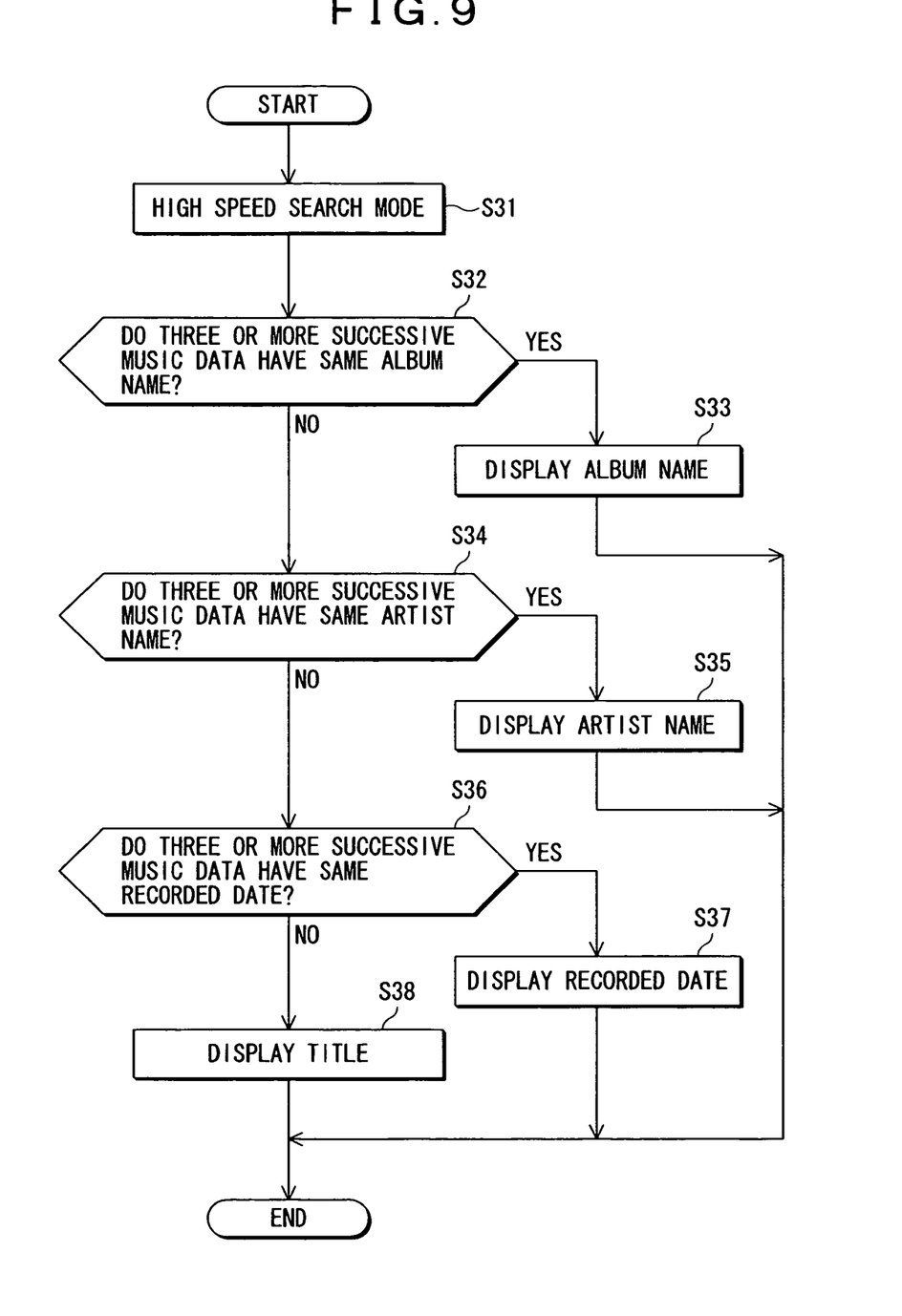
FIG. 9 is a flowchart showing a music selection method according to a second embodiment.

FIG. 9 is a flowchart showing the music selection method according to the second embodiment of the present invention. The present embodiment is different from the first embodiment in the operation of the rotary encoder 32 being rotated at a high speed, and is the same as the first embodiment in terms of the operation of the rotary encoder 32 being rotated at a low speed. Thus, a description will be omitted for the same portions. The description of the present embodiment also will be given with reference to the block diagram of the audio reproducing apparatus in FIG. 3. Moreover, it is assumed that the added information such as the title, the album name, the artist name, and/or the genre is added to the respective music data in the present embodiment.

Referring to FIG. 9, when the rotary encoder 32 is rotated at a high speed, the display mode is first set to the high speed search mode in step S31, and the main control unit 20 proceeds to step S32. In the present embodiment, the main control unit 20 determines that the rotary encoder 32 rotates at a high speed when the click signal is successively entered three or more times at an interval less than 50 msec as in the first embodiment.

In step S32, the main control unit 20 reads out the added information of the music data at the position being searched and that of the following music data from the hard disk 21 through the drive control unit 22, and determines whether three or more successive music data have the same album name. The main control unit 20 proceeds to step S33 upon three or more successive music data having the same album name, and displays the album name on the display unit 27 while the position being searched is at any of these music data.

On the other hand, if three or more successive music data do not have the same album name in step S32, the main control unit 20 proceeds to step S34, and the main control unit 20 determines whether three or more successive music data have the same artist name. The main control unit 20 proceeds to step S35 upon three or more successive music data having the same artist name, and displays the artist name on the display unit 27 while the position being searched is at any of these music data.

On the other hand, if three or more successive music data do not have the same artist name in step S34, the main control unit 20 proceeds to step S36, and the main control unit 20 determines whether three or more successive music data have the same recorded date. The main control unit 20 proceeds to step S37 upon three or more successive music data having the same recorded date (date of the music data being recorded), and displays the recorded date on the display unit 27 while the position being searched is at any of these music data.

On the other hand, if three or more successive music data do not have the same recorded date in step S36, the main control unit 20 proceeds to step S38 and displays the title on the display unit 27.

In the present embodiment, when the rotary encoder 32 is rotated at a fast speed, an album name is displayed on the display unit 27 for successive music data having the same album name. Moreover, an artist name is displayed on the display unit 27 for successive music data not having the same album name, but having the same artist name. Further, a recorded date is displayed on the display unit 27 for successive music data not having the same album name or the same artist name, but having the same recorded date. As a result, even if music data are not classified into folders, a desired music data can be searched for in a short period.

Figure 10:
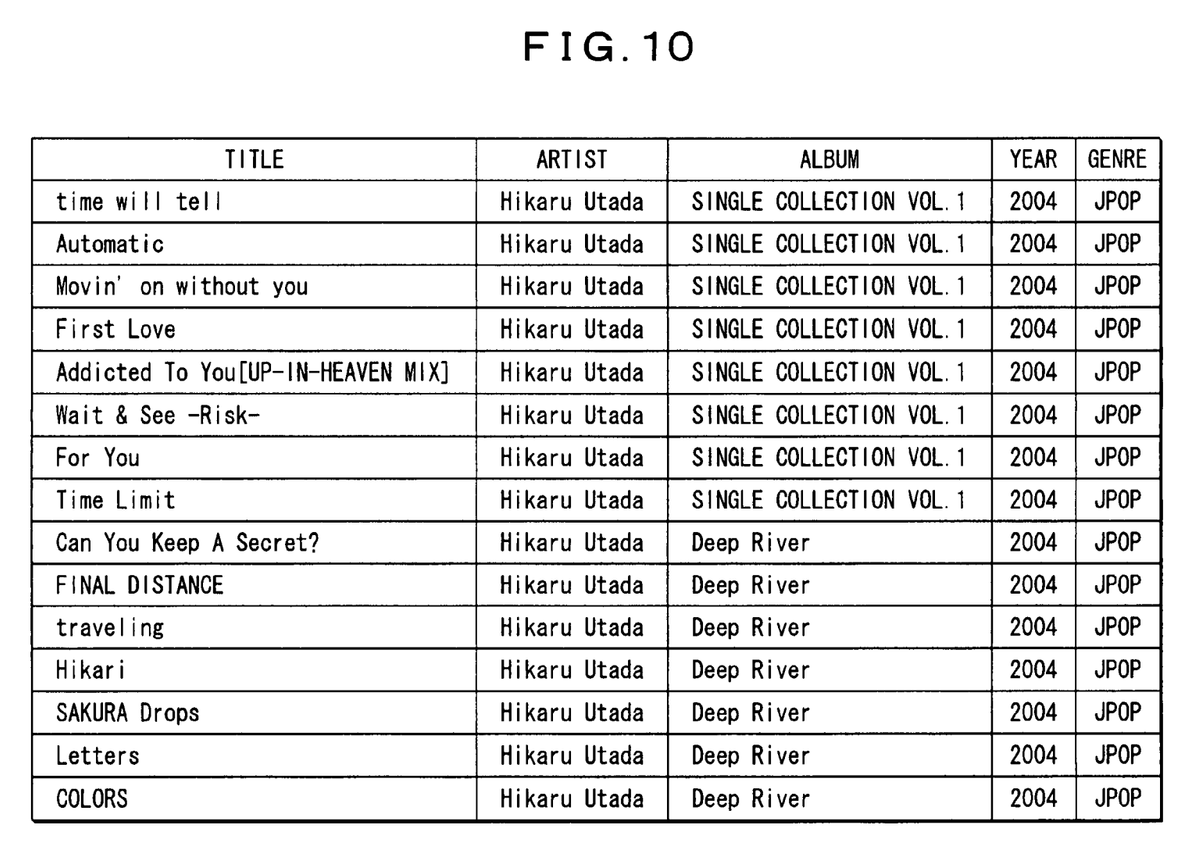
FIG. 10 is a view showing music data and added information thereof recorded on a recording medium.

Although the priority of the items displayed on the display unit in the second embodiment is arranged as the album name, the artist name, and the recorded date from the highest priority when the rotary encoder 32 is rotated at a high speed, a user may set the priority. If music data containing added information are recorded on a recording medium as shown in FIG. 10, for example, the user may arbitrarily set the order of priority from among "Album name", "Artist name", "Year", and "Genre".

Moreover, although the description is given of the case where the music data are not classified into folders in the second embodiment, the present invention can be applied to a case where music data are classified into folders, and a case where music data classified into folders and music data not classified into folders exist together at the same time.

Further, although there is used the threshold of three to determine whether the music data having the same album name, artist name, or recorded date are successive or not to change the information displayed on the display unit 27 in the second embodiment, it is understood that the threshold is not limited to three.

Third Embodiment

Although the description is given of the audio reproducing apparatus having a narrow display area on the display unit in both the first and second embodiments, a description will be given of a music selection method preferred for an audio reproducing apparatus provided with a display unit with a wide display area in a third embodiment. The present embodiment is different from the first embodiment in the information displayed on the display unit 27 when the rotary encoder 32 is rotated at a low speed (in the low speed search mode) and in the information displayed on the display unit 27 when the rotary encoder 32 is rotated at a high speed (in the high speed search mode), and otherwise has the same configuration as that of the first embodiment. Thus, a description will be omitted for the duplicated sections. The description will be given of the present embodiment also with reference to the block diagram of the audio reproducing apparatus in FIG. 3.

Figure 11:
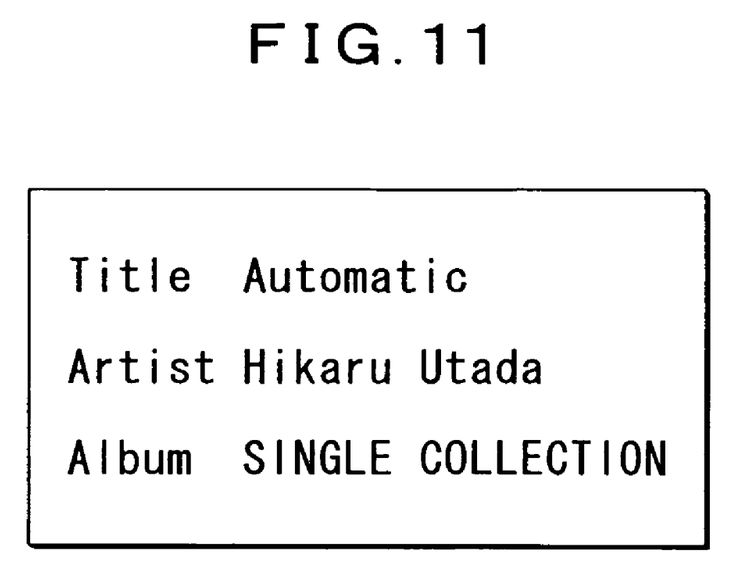
FIG. 11 is a view showing an example of a screen display when the rotational speed of a rotary encoder is slow according to a third embodiment.
Figure 12:
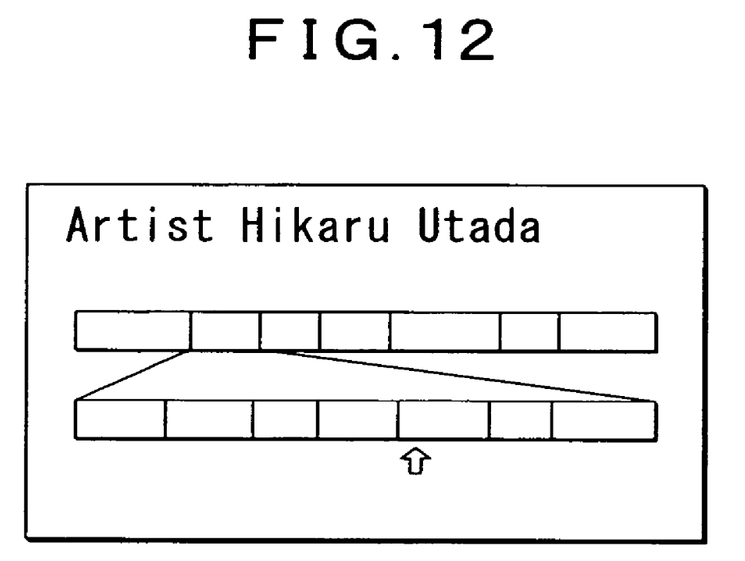
FIG. 12 is a view showing an example of a screen display when the rotational speed of a rotary encoder is fast according to the third embodiment.

According to the present embodiment, when the rotary encoder 32 is rotated at a low speed (in the low speed search mode), the title, artist name, and album name are displayed on the display unit 27 as shown in FIG. 11. When the rotary encoder 32 is rotated at a high speed (in the high speed search mode), a chart showing the positions of respective folders in relation to an entire search area on the hard disk 21 is displayed on a upper portion of the screen of the display unit 27, a chart showing the positions of the respective music data in relation to an entire search area within a folder presently being searched with an arrow showing a position presently being searched are displayed on a lower portion of the screen, and further data (artist name in this example) common to the music data within the folder presently being searched are displayed as shown in FIG. 12.

According to the present embodiment, the position presently being searched is more clearly recognized when the rotary encoder 32 is rotated at a fast speed compared with the first and second embodiments.

Although the music data is searched for by means of the rotary encoder 32 in the first to third embodiments, the present invention is not limited to this configuration. For example, when the track-up button or track-down button is depressed for a short period, the position to be searched may be changed to the following or preceding music data, and when the track-up button or track-down button is depressed for a long period (when the track-up button or track-down button is depressed for two seconds or more, for example), the display mode may be changed to the same display mode as when the rotary encoder 32 is rotated at a high speed in the first embodiment.

Although the description is given of the case where the recording medium is a hard disk in the first to third embodiments, it is obvious that a disk other than a hard disk such as a CD-R and a CD-RW, or an IC memory may be used in the present invention.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An audio reproducing apparatus comprising:
a recording medium that records a plurality of music data;
a data reading unit that reads out the music data from said recording medium;
a signal processing unit that performs signal processing of the music data read out by said data reading unit, and then converts the music data into an audio signal;
an operation unit that is provided with at least one operation element;
a display unit; and
a main control unit that controls said data reading unit, said signal processing unit, and said display unit according to a signal supplied from said operation unit,
wherein said main control unit sets a display mode to either a low speed search mode or a high speed search mode based upon a signal supplied from said operation unit according to an operation carried out on the operation element;
upon the low speed search mode being set, said main control unit sequentially searches the music data recorded on said recording medium, and displays on said display unit a title of only one music data at a position being searched; and
upon the high speed search mode being set, said main control unit sequentially searches the music data recorded on said recording medium, reads information of the music data being searched and information of at least one following music data, determines whether successive music data have common information, and displays on said display unit said information common to music data at a position being searched and music data successive to the music data at the position being searched.

2. The audio reproducing apparatus according to claim 1, wherein a rotary encoder is provided as said operation element, and said main control unit sets said display mode to the high speed search mode based upon the signal supplied from said operation unit if said rotary encoder is rotated faster than a certain angular velocity.

3. The audio reproducing apparatus according to claim 1, wherein said operation element is a predetermined operation button, and said main control unit sets said display mode to the high speed search mode based upon the signal supplied from said operation unit if said operation button is being depressed for a long period.

4. The audio reproducing apparatus according to claim 1, wherein said recording medium is a hard disk.

5. A music selection method for an audio reproducing apparatus including a recording medium that records a plurality of music data, a data reading unit that reads out the music data from said recording medium, a signal processing unit that performs signal processing of the music data read out by said data reading unit, and then converts the music data into an audio signal, an operation unit that is provided with at least one operation element, a display unit, and a main control unit that controls said data reading unit, said signal processing unit, and said display unit according to a signal supplied from said operation unit, wherein:

said main control unit sets a display mode to either a low speed search mode or a high speed search mode based upon a signal supplied from said operation unit according to an operation carried out on said operation element;

upon the low speed search mode being set, said main control unit sequentially searches the music data recorded on said recording medium, and displays on said display unit a title of only one music data at a position being searched; and upon the high speed search mode being set, said main control unit sequentially searches the music data recorded on said recording medium, reads information of the music data being searched and information of at least one following music data, determines whether successive music data have common information, and displays on said display unit said information common to music data at a position being searched and music data successive to the music data at the position being searched.

6. The music selection method according to claim 5, wherein a condition for a transition from said low speed search mode to said high speed search mode and a condition for a transition from said high speed search mode to said low speed search mode are independently set.

7. The music selection method according to claim 5, wherein the information common to said successive music data is a folder name of a folder that stores said successive music data.

8. The music selection method according to claim 5, wherein the information common to said successive music data is information extracted from added information added to said respective successive music data.

9. The music selection method according to claim 5, wherein the information common to said successive music data is information on at least one of the title, an album name, an artist name, and a recorded date.

10. The music selection method according to claim 5, wherein said main control unit displays a chart showing the position of a folder storing said successive music data in relation to an entire search area of said recording medium as the information common to said successive music data on said display unit.

11. The music selection method according to claim 5, wherein said operation element is a rotary encoder.

12. The music selection method according to claim 5, wherein said operation element is a predetermined operation button, and said main control unit sets said display mode to the high speed search mode based upon the signal supplied from said operation unit if said operation button is being depressed for a long period.

13. The music selection method according to claim 5, wherein said recording medium is a hard disk.

14. The audio reproducing apparatus according to claim 1, wherein the information common to said successive music data is a folder name of a folder that stores said successive music data.

15. The audio reproducing apparatus according to claim 1, wherein the information common to said successive music data is information on at least one of the title, an album name, an artist name, and a recorded date.

16. The audio reproducing apparatus according to claim 1, wherein said main control unit displays a chart showing the position of a folder storing said successive music data in relation to an entire search area of said recording medium as the information common to said successive music data on said display unit.

17. A music selection method for an audio reproducing apparatus including a recording medium that records a plurality of music data, a data reading unit that reads out the music data from said recording medium, a signal processing unit that performs signal processing of the music data read out by said data reading unit, and then converts the music data into an audio signal, an operation unit that is provided with at least one operation element, a display unit, and a main control unit that controls said data reading unit, said signal processing unit, and said display unit according to a signal supplied from said operation unit, wherein:

said main control unit sets a display mode to either a low speed search mode or a high speed search mode based upon a signal supplied from said operation unit according to an operation carried out on said operation element;

upon the low speed search mode being set, said main control unit sequentially searches the music data recorded on said recording medium, and displays on said display unit a title of only one music data at a position being searched; and upon the high speed search mode being set, said main control unit sequentially searches the music data recorded on said recording medium, reads information of the music data being searched and information of at least one following music data, determines whether successive music data have common information, and displays on said display unit said information common to music data at a position being searched and music data successive to the music data at the position being searched;

wherein said common information is at least one of the title, an album name, an artist name, a genre, and a recorded date, and said common information is displayed if at least a predetermined number of successive pieces of music data have said common information.

* * * * *